United States Patent
Ogawa et al.

(10) Patent No.: US 10,189,343 B2
(45) Date of Patent: Jan. 29, 2019

(54) CASE STRUCTURE OF POWER EQUIPMENT UNIT

(71) Applicant: HONDA MOTOR CO., LTD., Tokyo (JP)

(72) Inventors: Jun Ogawa, Saitama (JP); Yuta Tsumura, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/667,948

(22) Filed: Aug. 3, 2017

(65) Prior Publication Data
US 2018/0065458 A1   Mar. 8, 2018

(30) Foreign Application Priority Data
Sep. 2, 2016   (JP) .................................. 2016-171808

(51) Int. Cl.
*B60K 1/00* (2006.01)
*B60K 1/04* (2006.01)
*B60K 11/06* (2006.01)

(52) U.S. Cl.
CPC ................ *B60K 1/04* (2013.01); *B60K 11/06* (2013.01); *B60K 2001/005* (2013.01); *B60K 2001/0422* (2013.01); *B60Y 2410/10* (2013.01)

(58) Field of Classification Search
CPC ...... B60K 1/04; B60K 2001/005; B60K 6/28; B60K 6/40; B60K 2001/0422; B60K 1/00; B60L 11/1896; B60L 11/1874
See application file for complete search history.

(56) References Cited

U.S. PATENT DOCUMENTS

| 8,413,751 | B2 * | 4/2013 | Jufuku | H01M 8/00 180/312 |
| 2001/0030069 | A1 * | 10/2001 | Misu | B60K 1/04 180/68.1 |
| 2004/0235315 | A1 * | 11/2004 | Masui | B60K 1/04 439/34 |
| 2012/0175177 | A1 * | 7/2012 | Lee | B60K 1/04 180/68.5 |

(Continued)

FOREIGN PATENT DOCUMENTS

| JP | 2004-142524 A | 5/2004 |
| JP | 2007-050802 A | 3/2007 |

(Continued)

OTHER PUBLICATIONS

Mar. 20, 2018, Japanese Office Action issued for related JP Application No. 2016-171808.

*Primary Examiner* — Hau V Phan
(74) *Attorney, Agent, or Firm* — Paratus Law Group, PLLC (57) ABSTRACT

A case structure of a power equipment unit, which accommodates a power equipment mounted in a vehicle and is disposed in a power equipment unit accommodating part provided on a floor panel, includes: a case body having an upper portion opened to accommodate the power equipment; a lid member which covers the upper portion of the case body; and a cover member which is attached to the lid member and covers at least an opening part formed in the lid member. The cover member has an intake port which takes in air from outside, and a levee wall is provided in front of the intake port.

12 Claims, 5 Drawing Sheets

(56) References Cited

U.S. PATENT DOCUMENTS

| | | | | |
|---|---|---|---|---|
| 2013/0146373 | A1* | 6/2013 | Kosaki | B60K 1/04 |
| | | | | 180/65.1 |
| 2013/0319779 | A1* | 12/2013 | Nitawaki | B60L 11/1874 |
| | | | | 180/68.5 |
| 2014/0191556 | A1 | 7/2014 | Krenz et al. | |
| 2014/0262573 | A1* | 9/2014 | Ito | B60K 1/04 |
| | | | | 180/68.5 |
| 2014/0326524 | A1* | 11/2014 | Ogushi | B60K 1/04 |
| | | | | 180/68.5 |
| 2016/0039263 | A1 | 2/2016 | Mori et al. | |
| 2016/0121752 | A1* | 5/2016 | Takeyama | B60L 11/1896 |
| | | | | 180/68.5 |
| 2016/0243919 | A1 | 8/2016 | Yamanaka et al. | |

FOREIGN PATENT DOCUMENTS

| | | |
|---|---|---|
| JP | 2009-154826 A | 7/2009 |
| JP | 2010-285070 A | 12/2010 |
| JP | 2012-084639 A | 4/2012 |
| JP | 2012-099288 A | 5/2012 |
| JP | 2013-252731 A | 12/2013 |
| JP | 2014-015178 A | 1/2014 |
| JP | 2014-034274 A | 2/2014 |
| JP | 2015-217820 A | 12/2015 |
| JP | 2016-153279 A | 8/2016 |
| WO | WO 2014/162892 A1 | 10/2014 |

* cited by examiner

CASE STRUCTURE OF POWER EQUIPMENT UNIT

CROSS-REFERENCE TO RELATED APPLICATION (S)

This application claims priority from Japanese Patent Application No. 2016-171808 filed on Sep. 2, 2016, the entire contents of which are incorporated herein by reference.

FIELD

The present invention relates to a case structure of a power equipment unit which accommodates a power equipment such as a vehicle driving battery.

BACKGROUND

A battery (battery module) is mounted on a hybrid vehicle which travels using an engine and a motor in combination, an electric vehicle which travels only using a motor, and the like to store electric power and supply the electric power to the motor (for example, JP-A-2010-285070 and JP-A-2012-099288). The battery is accommodated generally as a part of a power equipment unit in a case together with high-voltage devices such as an inverter.

In order to prevent performance degradation of the power equipment such as the battery due to an abnormal temperature rise, these types of vehicles are provided with a cooling mechanism which maintains a temperature of the power equipment within an appropriate range.

By the way, in a structure where the case of the power equipment unit is disposed on a floor panel below a seat or the like, air warmed by heat of a high-heat member such as an exhaust pipe disposed below the floor panel or a high-voltage device accommodated in the case of the power equipment unit may stay on a lid member or a carpet covering the lid member in some cases. If such warmed air is sucked from an intake port, there is a possibility that the power equipment cannot be efficiently cooled.

SUMMARY

The invention is to provide a case structure of a power equipment unit capable of suppressing suction of warmed air from an intake port and efficiently cooling the power equipment.

The invention provides following aspects (1) to (8).

(1) A case structure of a power equipment unit (e.g. a power equipment unit 20) which accommodates a power equipment (e.g. a battery 50) mounted in a vehicle (e.g. a vehicle 1) and is disposed in a power equipment unit accommodating part (e.g. a power equipment unit accommodating part 10) provided on a floor panel (e.g. a floor panel 9), the case structure including:

a case body (e.g. a case body 31) having an upper portion opened to accommodate the power equipment;

a lid member (e.g. a lid member 40) which covers the upper portion of the case body; and a cover member (e.g. a cover member 60) which is attached to the lid member and covers at least an opening part formed in the lid member, wherein the cover member has an intake port (e.g. an intake port 65) which takes in air from outside, and a levee wall (e.g. a levee wall 68) is provided in front of the intake port.

(2) The case structure of the power equipment unit according to the aspect (1), wherein the lid member is provided with a cover member disposing part (e.g. a cover member disposing part 47) having a recess shape concaved from an upper surface (e.g. an upper surface 48) of the lid member, the cover member is disposed in the cover member disposing part such that the intake port is located higher than the upper surface, and an upper end (e.g. an upper end 68*u*) of the levee wall is located above an imaginary line (e.g. an imaginary line P1) passing through a lower end (e.g. a lower end 65*d*) of the intake port from an intersection (e.g. an intersection X1) between the upper surface of the lid member and the cover member disposing part in a sectional view.

(3) The case structure of the power equipment unit according to the aspect (1) or (2), wherein a carpet (e.g. a carpet 80) is laid on the lid member so as to avoid the intake port, the cover member is disposed on an upper surface of the lid member such that the intake port is located higher than the carpet, and an upper end of the levee wall is located above an imaginary line (e.g. an imaginary line P2) passing through a lower end (e.g. a lower end 65*d*) of the intake port from a corner portion (e.g. a corner portion X2) of the carpet opposed to the intake port in a sectional view.

(4) The case structure of the power equipment unit according to any one of the aspects (1) to (3), wherein the intake port is provided on a face (e.g. a front wall 62) of the cover member at a front-side of the vehicle.

(5) The case structure of the power equipment unit according to any one of the aspects (1) to (4), wherein the levee wall is formed integrally with the cover member, and a groove (e.g. a groove 66) is provided between the levee wall and the intake port.

(6) The case structure of the power equipment unit according to the aspect (5), wherein the power equipment includes a vehicle driving battery (e.g. a battery 50).

(7) The case structure of the power equipment unit according to the aspect (5) or (6), wherein the power equipment unit is disposed below a seat (e.g. a front seat 5).

(8) The case structure of the power equipment unit according to the aspect (7), wherein the intake port is disposed to be positioned under the seat even in a state where the seat moves to a most front side or a most rear side of the vehicle.

According to the aspect (1), when the power equipment unit is disposed in the power equipment unit accommodating part provided on the floor panel, the air warmed by the heat of the high-heat member such as the exhaust pipe disposed below the floor panel or the high-voltage device such as an ECU, a DC-DC converter, or an inverter accommodated in the case of the power equipment unit may stay on the lid member or the carpet covering the lid member in some cases. However, by the levee wall provided in front of the intake port, the warmed air staying on the lid member or the carpet covering the lid member can be prevented from being sucked from the intake port, and the power equipment can be efficiently cooled.

According to the aspect (2), since the intake port is located at the position higher than the upper surface of the lid member and the upper end of the levee wall is located above the imaginary line passing through the lower end of the intake port from the intersection between the upper surface of the lid member and the cover member disposing part in a sectional view, it is prevent the warmed air staying on the upper surface of the lid member from being sucked directly from the intake port.

According to the aspect (3), since the intake port is located at the position higher than the carpet and the upper end of the levee wall is located above the imaginary line passing through the lower end of the intake port from the corner portion of the carpet in a sectional view, it is prevent the warmed air staying on the carpet from being sucked directly from the intake port.

According to the aspect (4), since a heat source such as the engine is often disposed in front of the vehicle and the warm air flows from the front to the rear of the vehicle during use of a heater, the intake port is provided on the front side of the vehicle, and the levee wall is provided ahead of the intake port, and thus the influence of the warmed air and the warm air can be suppressed.

According to the aspect (5), since the levee wall is formed integrally with the cover member, the levee wall can be easily manufactured. In addition, since the groove is provided between the levee wall and the intake port, even in a case where the occupant sitting on the seat spills liquid such as drink held by the container, the liquid can be prevented from entering into the case of the power equipment unit from the intake port.

According to the aspect (6), the vehicle driving battery is cooled by the air taken in from the intake port, and it is possible to avoid a risk that the battery is exposed to the liquid.

According to the aspect (7), normally, even in a case where the occupant sitting on the seat spills liquid such as drink held by the container, the liquid rarely reaches the lower side of the seat, and thus, it can be effectively prevented that the liquid is infiltrated from the intake port into the case body. That is, even in a case where the intake port is disposed below the seat, flooding can be avoided while cooling air is secured from a narrow gap between the floor surface and the seat to cool the power equipment. Further, it is possible to reduce unpleasantness of the occupant due to the effect of noise during cooling.

According to the aspect (8), the intake port is disposed to be positioned under the seat even in a state where the seat moves to a most front side or a most rear side of the vehicle. Thus, it is possible to prevent the infiltration of the liquid more effectively.

DETAILED DESCRIPTION

Hereinafter, one embodiment of the present invention will be described in detail with reference to the accompanying drawings. Incidentally, the drawings are viewed in directions indicated by reference numerals. In the following description, a front and rear side, a right and left side, and a vertical side follow directions in which a driver views. In the drawings, the front side of the vehicle is indicated by Fr, the rear side is indicated by Rr, the left side is indicated by L, and the right side is indicated by R, the upper side is indicated by U, and the lower side is indicated by D.

Figure 1:
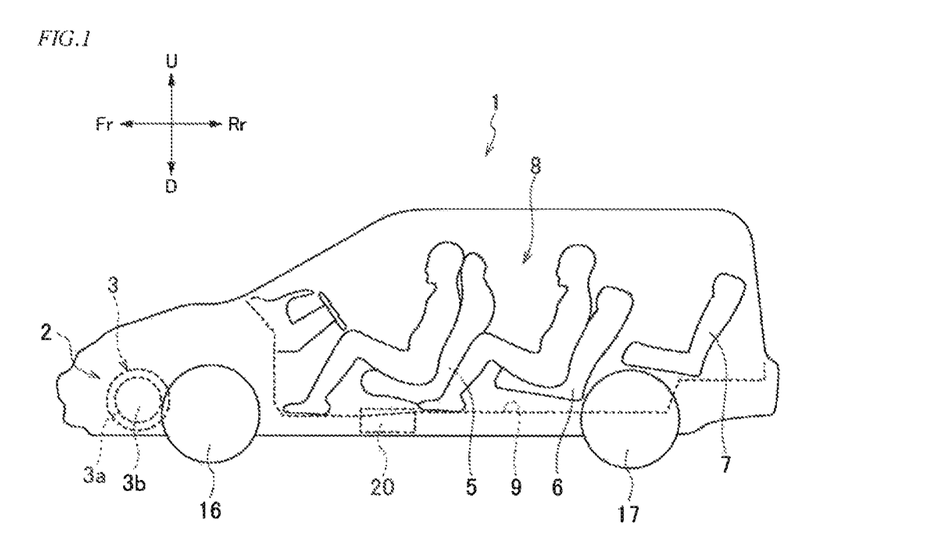
FIG. 1 is a schematic view illustrating a hybrid vehicle provided with a power equipment unit according to one embodiment of the present invention.

FIG. 1 is a schematic view illustrating a hybrid vehicle in which a power equipment unit according to one embodiment of the present invention is mounted. The vehicle 1 is mounted with a power unit 3 in which an engine 3a and a motor generator 3b are installed in series in an engine room 2 in the front side of the vehicle. For example, the motor generator 3b is a three-phase AC motor. The vehicle 1 is a hybrid vehicle which is driven by the engine 3a and/or the motor generator 3b, and is capable of recovering electric power from the motor generator 3b during vehicle deceleration and the like.

In the vehicle 1, a driving force of the engine 3a and the motor generator 3b is transmitted to a front wheel 16 which is a driving wheel. A rear wheel 17 is a driven wheel. In addition, when the driving force is transmitted from the front wheel 16 to the motor generator 3b during deceleration of the vehicle 1 and the like, the motor generator 3b functions as a generator to generate a so-called regenerative braking force so that kinetic energy of the vehicle 1 is recovered as electric energy. The recovered electric energy is charged in a battery 50 (see FIG. 2) through an electric power converter such as an inverter included in a high-voltage device to be described later.

At the rear side of the engine room 2, a passenger compartment 8 is provided in which a front seat 5, a middle seat 6, and a rear seat 7 are disposed.

Figure 2:
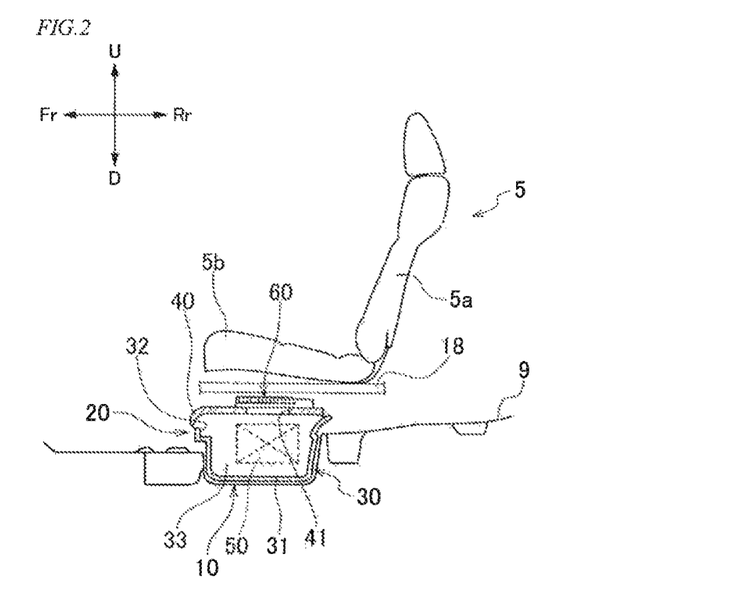
FIG. 2 is a schematic side view (partially sectional view) of the power equipment unit and a seat.

A power equipment unit 20 connected with the power unit 3 through an electric power cable (not illustrated) is disposed on the lower side of the front seat 5 (a driver's seat and a front passenger's seat) in the passenger compartment 8. FIG. 2 is a schematic side view (partially sectional view) of the power equipment unit 20 and the front seat 5. All components within the power equipment unit 20 excluding the battery 50 are not illustrated.

As illustrated in FIG. 2, the front seat 5 is provided on the upper side of a floor panel 9 in the passenger compartment 8. The front seat 5 includes a back rest part 5a and a seat part 5b, and is attached in a seat rail 18 extending on the upper side of the floor panel 9 in a front and rear direction, so as to be supported to be slidingly movable in the same direction.

A recessed power equipment unit accommodating part 10 is provided on the lower side of the front seat 5 of the floor panel 9, and the power equipment unit 20 is accommodated in the power equipment unit accommodating part 10. The power equipment unit 20 is a unit which includes the battery 50, the high-voltage device and a power distribution component (not illustrated) for controlling giving and receiving of the electric power of the battery 50, a main switch (not illustrated) for the battery 50, and a case 30 which accommodates those components.

The case 30 of the power equipment unit 20 includes a bottomed container-shaped case body 31, a lid member 40 which covers the upper portion of the case body 31, and a cover member 60 which covers an opening part 41 provided in the lid member 40. The battery 50, the high-voltage device, the power distribution component (high-voltage power distribution component) and the like are accommodated inside the case body 31. The case body 31 is shaped in a bottomed container which has an opening 32 directed to the upper side of the vehicle 1. The interior thereof serves as an accommodating part 33 for accommodating the battery 50 and the like. The lid member 40 is a substantially plate-shaped member which blocks the opening 32 of the case body 31.

Although not illustrated in detail, the battery 50 is provided in a state where a plurality of battery cells are bundled together. In addition, the high-voltage device is electronic equipment including the inverter and a DC/DC converter. Electronic equipment such as ECU is also provided in the high-voltage device. By the function of the high-voltage device, direct current is obtained from the battery 50, the direct current is converted into three-phase alternating current, the current is supplied to the motor generator 3b to drive it, and regenerative current from the motor generator 3b is converted into direct current, thereby enabling the battery 50 to be charged.

Figure 3:
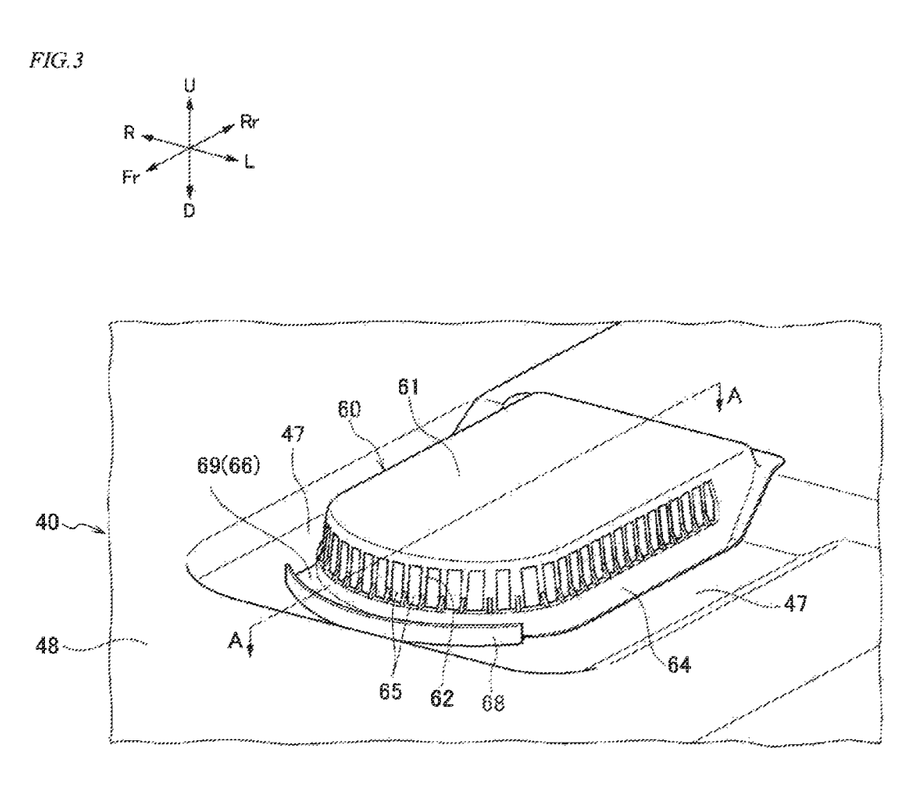
FIG. 3 is a perspective view partially illustrating a lid member and a cover member of the power equipment unit.
Figure 4:
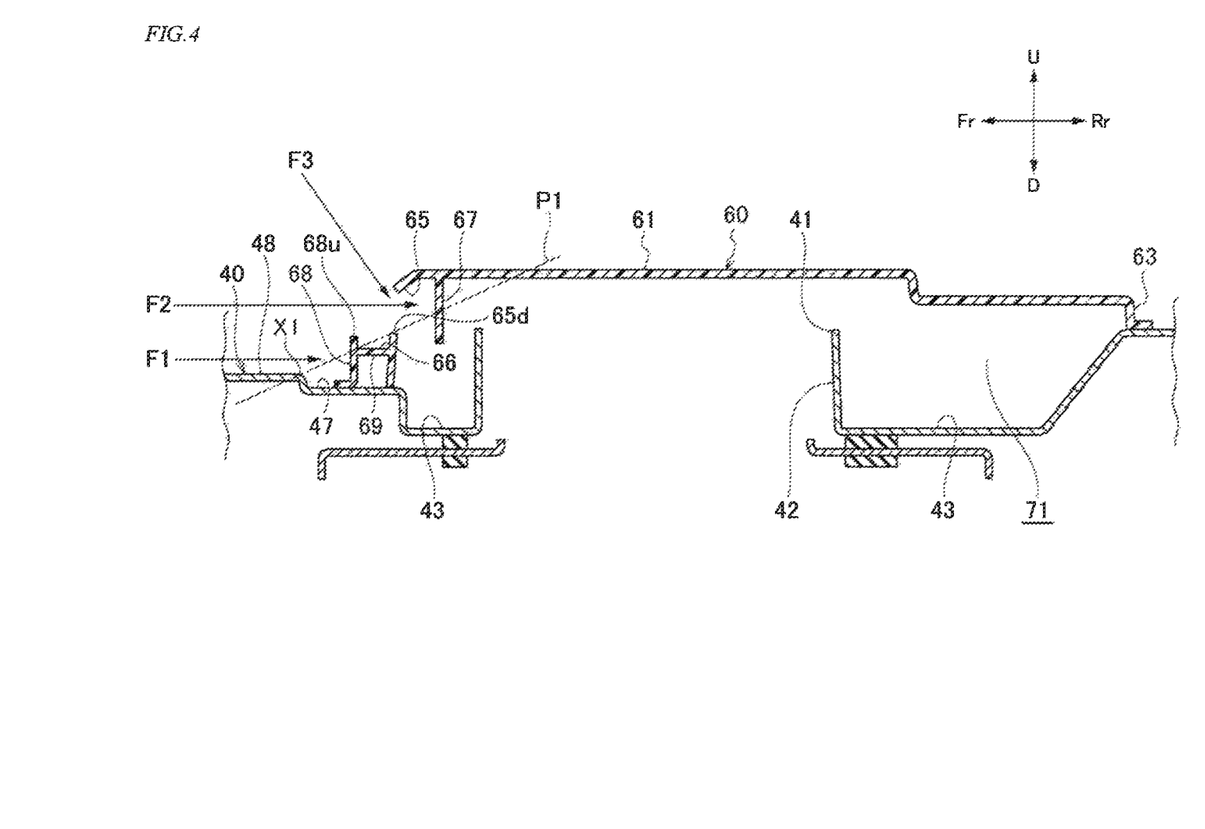
FIG. 4 is a sectional view taken along an arrow A-A of FIG. 3.

FIG. 3 is a partial perspective views illustrating the lid member 40 and the cover member 60 of the power equipment unit 20, FIG. 4 is a sectional view taken along an arrow A-A of FIG. 3.

The lid member 40 is attached to cover the upper portion of the case body 31, and the entire body thereof has a substantially plate shape. A recessed cover member disposing part 47 is formed on an upper surface 48 of the lid member 40 to be concaved from the upper surface 48. The opening part 41 formed of an elliptic through hole communicating with the inside of the case body 31 is formed inside the cover member disposing part 47.

The cover member 60 includes an upper wall 61, which is disposed on the upper surface side of the lid member 40 to cover the opening part 41 and the upper side of the vicinity thereof, and a front wall 62, a rear wall 63, and the right and left side walls 64 which extend downward from the circumferential edge of the upper wall 61, and the cover member 60 is disposed on the cover member disposing part 47 of the lid member 40. An intake port 65 formed of a plurality of slit-shaped through holes is formed in the front wall 62 of the cover member 60. The intake port 65 is provided in the entire front wall 62 of the cover member 60 and a portion (a portion of the side wall 64 on the front side) of the side wall 64. The intake port 65 is an intake port for taking cooling air into the power equipment unit 20, and the air taken in from the intake port 65 cools the battery 50 and the like through the opening part 41 of the lid member 40.

The intake port 65 is disposed at a position higher than the upper surface 48 of the lid member 40 in a state where the cover member 60 is disposed on the cover member disposing part 47. In other words, the cover member 60 is disposed on the cover member disposing part 47 such that the intake port 65 is located higher than the upper surface 48 of the lid member 40.

The cover member 60 is provided with a levee wall 68 further ahead of the front wall 62, and the levee wall 68 extends substantially parallel to the front wall 62. The front wall 62 and the levee wall 68 are connected to each other by a connecting wall 69 extending substantially parallel to the upper surface 48 of the lid member 40. That is, in the cover member 60, the levee wall 68 and the connecting wall 69 are formed integrally with the front wall 62. An upper end 68u of the levee wall 68 is located above an imaginary line P passing through a lower end 65d of the intake port 65 from the intersection X1 between the upper surface 48 of the lid member 40 and the cover member disposing part 47 in a sectional view.

Therefore, since the levee wall 68 exists in a path where the warmed air staying on the upper surface 48 of the lid member 40 flows to the intake port 65, the warmed air staying on the upper surface 48 of the lid member 40 is inhibited from flowing to the intake port 65 by the levee wall 68.

In this embodiment, the upper end 68u of the levee wall 68 has substantially the same height as the lower end 65d of the intake port 65, and the levee wall 68, the connecting wall 69, and the front wall 62 has substantially an H-shaped cross section. Thus, a flow F2 of air in a horizontal direction toward the intake port 65 and a flow F3 of air toward the intake port 65 from the upper side are permitted, while a flow F1 of air toward the intake port 65 from a lower side is inhibited by the connecting wall 69.

The connecting wall 69 connects the levee wall 68 and the front wall 62 below the upper end 68u of the levee wall 68 and below the lower end 65d of the intake port 65. For this reason, a groove 66 is formed between the levee wall 68 and the intake port 65. Therefore, even in a case where the occupant sitting on the seat spills liquid such as drink held by a container, the liquid is discharged from the groove 66 to the cover member disposing part 47, and thus the liquid can be prevented from infiltrating into the case of the power equipment unit 20 from the intake port 65. A drain groove (not illustrated) is formed at the rear of the cover member disposing part 47, and the liquid staying on the cover member disposing part 47 is drained from the drain groove to the outside of the power equipment unit 20.

The power equipment unit 20 has a space part 71 surrounded by the cover member 60 and the lid member 40. The space part 71 is provided with a partition wall part 67 having a thin-plate shape, and the partition wall part 67 extends just downward from the upper wall 61 of the cover member 60 to face the intake port 65.

In the cover member disposing part 47 of the lid member 40, a cylindrical circumferential wall 42 surrounding the opening part 41 and a recess part 43 surrounding the outer circumference of the circumferential wall 42 are formed.

The lower end of the partition wall part 67 is positioned below the upper end of the opening part 41 (circumferential wall 42) and below the lower end of the intake port 65. By partitioning the intake port 65 and the space part 71 by the partition wall part 67, a passage which reaches from the intake port 65 to the space part 71 becomes a labyrinth shape. The partition wall part 67 extends on the left side and the right side of the opening part 41 as well as the front side of the opening part 41.

In a case where a large amount of liquid such as water is spilled in the vicinity of the front seat 5 in the passenger compartment 8 by an occupant' mistake, the liquid cannot be completely recovered by the groove 66 of the cover member 60 and may be infiltrated from the intake port 65 of the first cover member 60 into the case 30. In this case, the liquid infiltrated from the intake port 65 enters into the recess part 43 of the opening part 41 on the front side, and is guided to the space part 71 therefrom. In this case, in a case where the liquid is vigorously infiltrated from the intake port 65, the liquid is caught by the partition wall part 67 to drip just downward, and enters into the recess part 43. By such a partition wall part 67, it can be prevented that the liquid infiltrated from the intake port 65 reaches the opening part 41 without being disturbed.

The liquid reaching the space part 71 in this manner is stored in recess part 43, and is discharged to the outside of the space part 71 (power equipment unit 20) through a drain passage (not illustrated). Therefore, even when the liquid infiltrates into the space part 71 from the intake port 65, the liquid such as water infiltrated from the intake port 65 can be prevented from entering into the case body 31 from the opening part 41, and thus is discharged outside from the space part 71.

As described above, according to the power equipment unit 20 of this embodiment, when the power equipment unit 20 is disposed in the power equipment unit accommodating part 10 provided on the floor panel 9, the air warmed by the heat of the high-heat member such as the exhaust pipe disposed below the floor panel 9 or the high-voltage device such as an ECU, a DC-DC converter, or an inverter accommodated in the case 30 of the power equipment unit 20 may stay on the lid member 40 in some cases. However, by the levee wall 68 provided in front of the intake port 65, the warmed air staying on the lid member 40 can be prevented from being sucked from the intake port 65, and the battery 50 can be efficiently cooled.

In addition, since the intake port 65 is located at the position higher than the upper surface 48 of the lid member 40 and the upper end 68*u* of the levee wall 68 is located above the imaginary line P1 passing through the lower end 65*d* of the intake port 65 from the intersection X1 between the upper surface 48 of the lid member 40 and the cover member disposing part 47 in a sectional view, it is prevent the warmed air staying on the upper surface 48 of the lid member 40 from being sucked directly from the intake port 65.

Further, since a heat source such as the engine 3*a* is disposed in front of the vehicle 1 and warm air flows from the front to the rear of the vehicle 1 during use of a heater, the levee wall 68 is provided ahead of the intake port 65 formed in the front wall 62, and thus the influence of the warmed air and the warm air can be suppressed.

Further, since the levee wall 68 is formed integrally with the cover member 60, the levee wall 68 can be easily manufactured. In addition, since the groove 66 is provided between the levee wall 68 and the intake port 65, even in a case where the occupant sitting on the seat spills liquid such as drink held by the container, the liquid can be prevented from entering into the case of the power equipment unit 20 from the intake port 65. Therefore, the vehicle driving battery 50 is cooled by the air taken in from the intake port 65, and it is possible to avoid a risk that the battery is exposed to the liquid.

Since the power equipment unit 20 is disposed below the front seat 5, normally, even in a case where the occupant sitting on the front seat 5 spills liquid such as drink held by the container, the liquid rarely reaches the lower side of the front seat 5, and thus, it can be effectively prevented that the liquid is infiltrated from the intake port 65 into the case body 31. That is, even in a case where the intake port 65 is arranged below the front seat 5, flooding can be avoided while cooling air is secured by a narrow gap between the floor surface and the front seat 5 to cool the battery 50. Further, it is possible to reduce unpleasantness of the occupant due to the effect of noise during cooling.

Figure 5A:
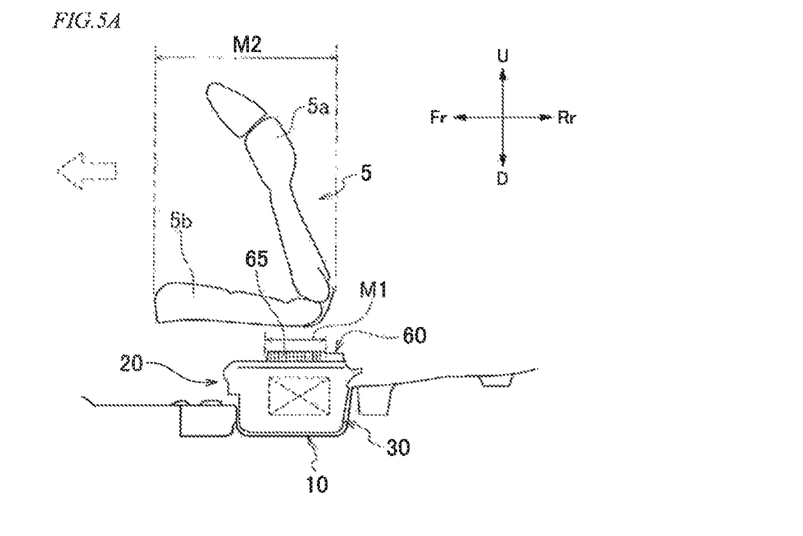
FIGS. 5A and 5B are schematic side views illustrating an arrangement configuration of the power equipment unit with respect to a front seat.
Figure 5B:
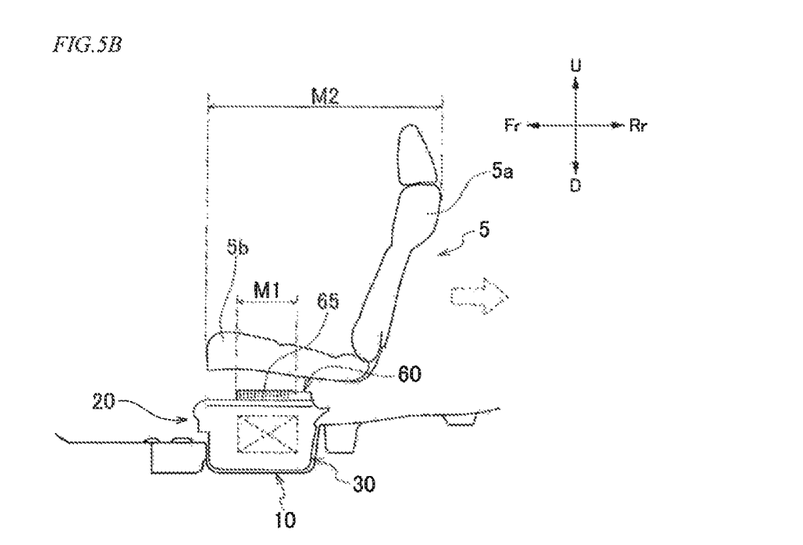

FIGS. 5A and 5B are views for explaining a position relation between the front seat 5 and the intake port 65 of the cover member 60. FIG. 5A is a view illustrating a state where the front seat 5 moving along the seat rail 18 (see FIG. 2) in the front and rear direction is positioned on a most front side, and FIG. 5B is a view illustrating a state where the front seat 5 is positioned on a most rear side. Incidentally, in the same drawings, the seat rail 18 is not illustrated. As illustrated in the same drawings, in both the state where the front seat 5 is positioned on the most front side and the state where the front seat 5 is positioned on the most rear side, the intake port 65 of the cover member 60 is right below the front seat 5. That is, even in the state the front seat 5 moving along the seat rail 18 in the front and rear direction is in any positions, an intake port range M1 is configured to be included in a seat range M2.

In the case structure of the power equipment unit 20 according to this embodiment, as described above, in any one of the state where the front seat 5 moves to the most front side of the vehicle 1 and the state where the front seat 5 moves to the most rear side, the intake port 65 is configured to be positioned right under the front seat 5. Thus, it can be prevented more effectively that liquid such as water is infiltrated from the intake port 65 into the case body 31.

Figure 6:
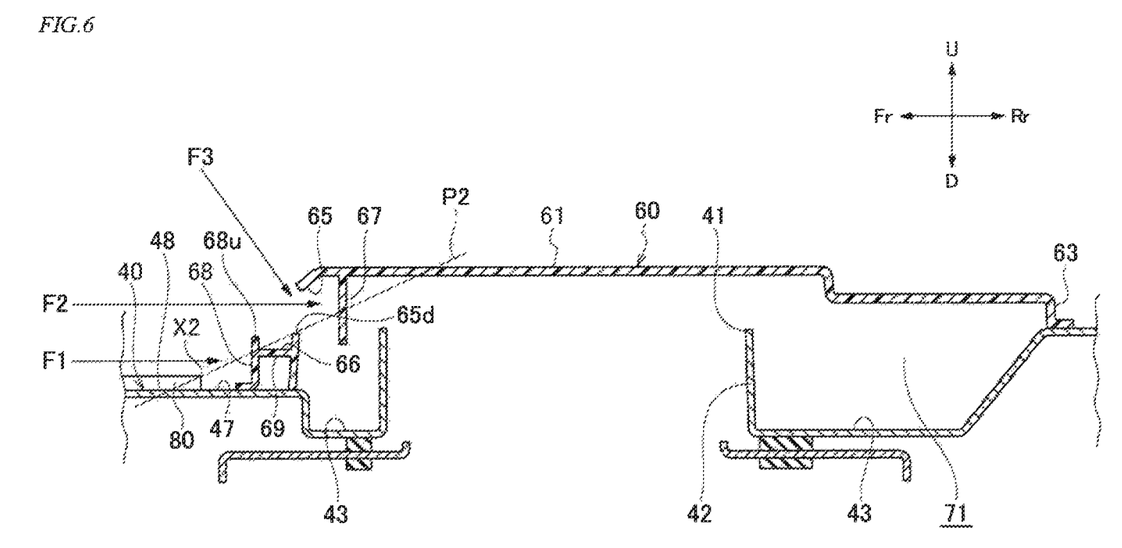
FIG. 6 is a sectional view illustrating a lid member and a cover member of a power equipment unit according to a modified example.

FIG. 6 is a sectional view illustrating a lid member 40 and a cover member 60 of a power equipment unit 20 according to a modified example.

In the modified example, a cover member disposing part 47 of the lid member 40 is not concaved, but a carpet 80 is laid on the lid member 40 so as to avoid an intake port 65 (cover member 60). The cover member disposing part 47 may be concaved from the upper surface 48 in a recess shape, similarly to the above embodiment.

The intake port 65 is disposed at a position higher than the carpet 80 in a state where the cover member 60 is disposed on the upper surface 48. In other words, the cover member 60 is disposed on the cover member disposing part 47 (upper surface 48) such that the intake port 65 is located higher than the carpet 80.

The cover member 60 is provided with a levee wall 68 further ahead of the front wall 62, the levee wall 68 extending substantially parallel to the front wall 62. The front wall 62 and the levee wall 68 are connected to each other by a connecting wall 69 extending substantially parallel to the upper surface 48 of the lid member 40. That is, in the cover member 60, the levee wall 68 and the connecting wall 69 are formed integrally with the front wall 62. An upper end 68*u* of the levee wall 68 is located above an imaginary line P2 passing through a lower end 65*d* of the intake port 65 from a corner portion X2 of the carpet 80 opposed to the intake port 65 in a sectional view.

Therefore, since the levee wall 68 exists in a path where the warmed air staying on the carpet 80 of the lid member 40 flows to the intake port 65, the warmed air staying on the carpet 80 is inhibited from flowing to the intake port 65 by the levee wall 68.

In this modified example, the upper end 68*u* of the levee wall 68 has substantially the same height as the lower end 65*d* of the intake port 65, and the levee wall 68, the connecting wall 69, and the front wall 62 have substantially an H-shaped cross section. Thus, a flow F2 of air in a horizontal direction toward the intake port 65 and a flow F3 of air toward the intake port 65 from the upper side are permitted, while a flow F1 of air toward the intake port 65 from a lower side is inhibited by the connecting wall 69.

Incidentally, the present invention is not limited to the above-described embodiment, but can be changed or improved properly.

For example, in the above-described embodiment, the power equipment unit accommodating part 10 accommodating the power equipment unit 20 is provided below the front seat 5. However, the power equipment unit accommodating part 10 may be provided below the middle seat 6 or below the rear seat 7 as well as below the front seat 5.

In addition, the battery 50 is exemplarily illustrated as a power equipment. However, the power equipment is not limited to the battery, and may be an inverter, a DC/DC converter, and the like. In the power equipment unit, these components may be accommodated singly or in a combined form in a case.

In addition, the hybrid vehicle is exemplarily illustrated as the vehicle 1. However, the vehicle 1 is not limited thereto, and may be an electric vehicle, a fuel battery vehicle, and the like.

The invention claimed is:

1. A case structure of a power equipment unit which accommodates a power equipment mounted in a vehicle and is disposed in a power equipment unit accommodating part provided on a floor panel, the case structure comprising:
   a case body having an upper portion opened to accommodate the power equipment;
   a lid member which covers the upper portion of the case body; and
   a cover member which is attached to the lid member and covers at least an opening part formed in the lid member, wherein
   the cover member has an intake port which takes in air from outside,
   a levee wall is provided in front of the intake port,
   the lid member is provided with a cover member disposing part having a recess shape concaved from an upper surface of the lid member,
   the cover member is disposed in the cover member disposing part such that the intake port is located higher than the upper surface, and
   an upper end of the levee wall is located above an imaginary line passing through a lower end of the intake port from an intersection between the upper surface of the lid member and the cover member disposing part in a sectional view.

2. The case structure of the power equipment unit according to claim 1, wherein
   the intake port is provided on a face of the cover member at a front-side of the vehicle.

3. The case structure of the power equipment unit according to claim 1, wherein
   the levee wall is formed integrally with the cover member, and
   a groove is provided between the levee wall and the intake port.

4. The case structure of the power equipment unit according to claim 3, wherein
   the power equipment includes a vehicle driving battery.

5. The case structure of the power equipment unit according to claim 3, wherein
   the power equipment unit is disposed below a seat.

6. The case structure of the power equipment unit according to claim 5, wherein
   the intake port is disposed to be positioned under the seat even in a state where the seat moves to a most front side or a most rear side of the vehicle.

7. A case structure of a power equipment unit which accommodates a power equipment mounted in a vehicle and is disposed in a power equipment unit accommodating part provided on a floor panel, the case structure comprising:
   a case body having an upper portion opened to accommodate the power equipment;
   a lid member which covers the upper portion of the case body; and
   a cover member which is attached to the lid member and covers at least an opening part formed in the lid member, wherein
   the cover member has an intake port which takes in air from outside,
   a levee wall is provided in front of the intake port,
   a carpet is laid on the lid member so as to avoid the intake port,
   the cover member is disposed on an upper surface of the lid member such that the intake port is located higher than the carpet, and
   an upper end of the levee wall is located above an imaginary line passing through a lower end of the intake port from a corner portion of the carpet opposed to the intake port in a sectional view.

8. The case structure of the power equipment unit according to claim 7, wherein
   the intake port is provided on a face of the cover member at a front-side of the vehicle.

9. The case structure of the power equipment unit according to claim 7, wherein
   the levee wall is formed integrally with the cover member, and
   a groove is provided between the levee wall and the intake port.

10. The case structure of the power equipment unit according to claim 9, wherein
    the power equipment includes a vehicle driving battery.

11. The case structure of the power equipment unit according to claim 9, wherein
    the power equipment unit is disposed below a seat.

12. The case structure of the power equipment unit according to claim 11, wherein
    the intake port is disposed to be positioned under the seat even in a state where the seat moves to a most front side or a most rear side of the vehicle.

* * * * *